US009695974B2

(12) United States Patent
Gordon

(10) Patent No.: US 9,695,974 B2
(45) Date of Patent: Jul. 4, 2017

(54) RESEALING SUCTION CUP HOLDING SYSTEM

(71) Applicant: Seph Gordon, Englewood, NJ (US)

(72) Inventor: Seph Gordon, Englewood, NJ (US)

( * ) Notice: Subject to any disclaimer, the term of this patent is extended or adjusted under 35 U.S.C. 154(b) by 0 days.

(21) Appl. No.: 14/874,589

(22) Filed: Oct. 5, 2015

(65) Prior Publication Data
US 2017/0097117 A1   Apr. 6, 2017

(51) Int. Cl.
*F16M 13/02* (2006.01)
*F16B 47/00* (2006.01)
*A45D 44/14* (2006.01)

(52) U.S. Cl.
CPC .......... *F16M 13/022* (2013.01); *A45D 44/14* (2013.01); *F16B 47/00* (2013.01)

(58) Field of Classification Search
CPC ....... F16M 13/022; A45D 44/14; F16B 47/00; F16B 47/006
USPC ...................... 248/206.2, 205.8, 205.7, 205.5
See application file for complete search history.

(56) References Cited

U.S. PATENT DOCUMENTS

| 355,021 | A | * | 12/1886 | Lang | F16B 47/00 |
| | | | | | 248/205.8 |
| 1,183,212 | A | * | 5/1916 | Lenzikow et al. | 211/96 |
| 2,968,104 | A | * | 1/1961 | Ito | G09B 25/00 |
| | | | | | 264/109 |
| 3,310,267 | A | * | 3/1967 | Koehler | A47F 7/065 |
| | | | | | 206/8 |
| 3,441,182 | A | * | 4/1969 | Gregory | A45D 44/14 |
| | | | | | 206/8 |
| 3,740,013 | A | * | 6/1973 | Bentley | A45D 44/14 |
| | | | | | 223/66 |
| 3,934,804 | A | * | 1/1976 | Bruce | A45D 44/14 |
| | | | | | 223/66 |
| 6,308,923 | B1 | * | 10/2001 | Howard | F16B 47/00 |
| | | | | | 248/205.5 |
| 7,066,434 | B2 | * | 6/2006 | Kwok | F16B 47/006 |
| | | | | | 248/205.5 |
| 7,168,577 | B1 | * | 1/2007 | Moseley | A47G 25/10 |
| | | | | | 211/32 |
| 7,338,020 | B2 | * | 3/2008 | Magid | F16B 47/006 |
| | | | | | 248/205.5 |
| 7,441,734 | B2 | * | 10/2008 | Liou | B60R 11/02 |
| | | | | | 248/205.5 |
| 7,628,362 | B2 | * | 12/2009 | Song | F16B 47/003 |
| | | | | | 248/205.5 |
| 7,878,467 | B2 | * | 2/2011 | Chen | F16B 47/00 |
| | | | | | 248/205.7 |
| 8,191,839 | B2 | * | 6/2012 | Fan | F16B 47/006 |
| | | | | | 248/205.5 |
| 2007/0018064 | A1 | * | 1/2007 | Wang | B60R 11/0241 |
| | | | | | 248/274.1 |
| 2007/0278371 | A1 | * | 12/2007 | Wang | B60R 11/00 |
| | | | | | 248/309.3 |
| 2009/0127411 | A1 | * | 5/2009 | Aguilar | B60R 11/02 |
| | | | | | 248/205.8 |

(Continued)

*Primary Examiner* — Anita M King

(57) ABSTRACT

A resealing suction cup mounting system and method wherein an arm pivotably connected to the suction cup is able to rotate in the direction of the suction cup and in so doing provide an impact force to be applied to the suction cup that cause a resealing action to occur. The impact force having a component that is perpendicular to the interface between the suction cup and a surface the suction cup is mounted to.

8 Claims, 5 Drawing Sheets

(56) References Cited

U.S. PATENT DOCUMENTS

2016/0053938 A1* 2/2016 Snustead .............. F16M 13/022
                      248/206.2

* cited by examiner

RESEALING SUCTION CUP HOLDING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD

The present application relates to suction cups and, in particular, their use for devices for holding wigs.

BACKGROUND

Suction cups are used to hold everything from industrial components to everyday applications like supporting the GPS attached to a car's windshield. However, as anyone that has a GPS attached to his or her car's windshield will attest, as good as lever type locking mechanism are, sooner or later, air will leak under the suction cup and it will fall. Unfortunately, when supporting heavy objects (where there is a significant bending moment) this occurs sooner rather than later. This can be disastrous especially when the object being supported is of significant value. For example, a fully customized wig can run $2,500 or more.

Not only can the weight of the object hanging from the suction cup lead to the object falling sooner but the momentary twisting and bending force applied to the suction cup when objects are being placed on and even removed from the associated suction cup support mechanism can greatly exacerbate the situation.

Therefore, there continues to be a need for a method in which the taking of objects on and off a suction cup supported apparatus reseals the suction cup rather than exacerbating the air leaks, which is particularly important for objects of that can be easily damaged or ruined if they fall.

SUMMARY

In order to overcome the deficiencies in the prior art, systems and methods are described herein.

One aspect of the claimed invention involves a suction cup mounting system comprising a suction cup with a support arm pivotably connected to the suction cup at the proximal end of the arm and the arm configured to pivot in the direction of the suction cup and apply an impact force to the suction cup capable of causing a resealing action of the suction cup to occur and a mounting attachment attached to the distal end of the arm a configured to support an item of interest. A further aspect involves the item of interest being an item worn on your head and still further aspect involves the item worn on the head being a wig.

An additional aspect of the claimed invention involves a method of applying a resealing force to a suction cup comprising: mounting the suction cup onto a surface and thereby forming an interface between the suction cup and the surface, wherein the suction cup has an arm pivotably connected to it that is offset from the a center running through the suction cup that is perpendicular to the interface such that, when the arm pivots in the direction of the suction cup, the arm is capable of applying an impact force substantially parallel to the center of the suction cup in order to cause resealing of the suction cup; suspending an item from the arm; removing the item from the arm; re-suspending the item from the arm and, in so doing, pivoting the arm in the direction of the suction cup and applying the impact force to cause resealing of the suction cup.

These and other aspects described herein present in the claims result in features and/or can provide advantages over current technology.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

DETAILED DESCRIPTION

The instant devices and approach provides a suction cup holding system that is capable of being mounted such that when items are taken off and on, the act of replacing the item causes a pitotably mounted arm supporting the item to cause a resealing force to be applied to the suction cup. Such a system is advantageous over fixed arm systems that do not create resealing because the suction cup of a fixed arm system will eventually fail. Exemplary systems consistent with the instant devices and approach will now be provided.

Figure 1A:
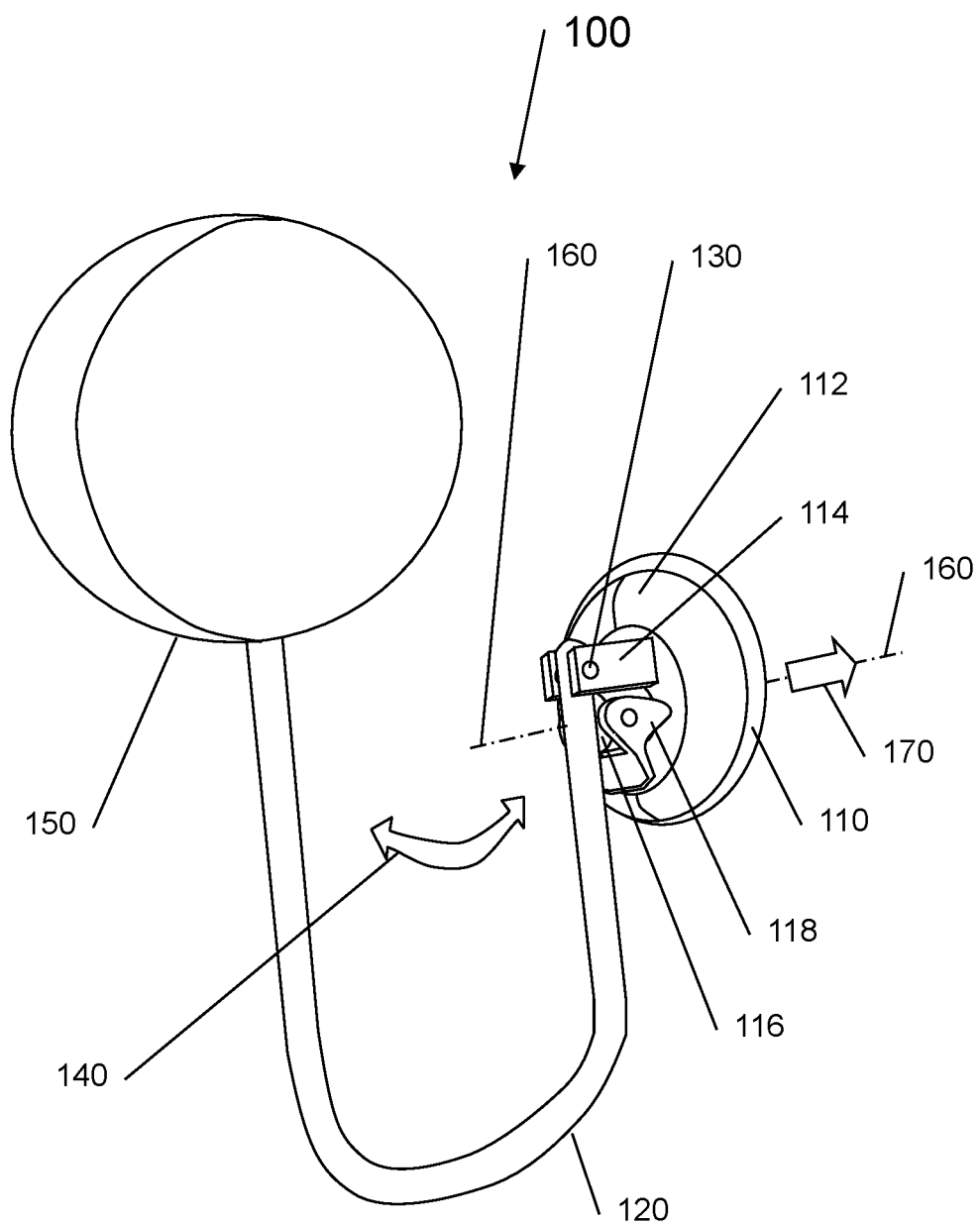
FIG. 1A show, in simplified form, a suction cup holding system with a pivoting arm.

FIG. 1A show, in simplified form, a suction cup holding system 100 with a pivoting arm 120, configured to apply a resealing force.

The suction cup holding system 100 of FIG. 1A comprises a suction cup 110 with suction cup hardware 112 that is configured to allow pivot hardware 114 to be mounted to the suction cup 110 in order that support arm 120 can be pivotably attached to the suction cup via a pivot point 130 integrally associated with pivot hardware 114. The arm 120, using pivot point 130, is able to pivot both towards and away from the suction cup 110, as represented by arrow 140. At the opposite end of the support arm, distal from the pivot point 130, is an attachment mechanism 150 configured to hold an item of interest (not shown).

Also shown in FIG. 1A is a suction cup center 160, which represents a geometric center 160 running through the suction cup 110 that is perpendicular to the interface between the suction cup and the surface on which it is mounted.

Additionally shown is FIG. 1A is an optional suction cup locking mechanism 118, which is known in the art and causes the suction cup 110 to be compressed toward the mounting surface. The locking mechanism 118 is advantageous because it increases the surface area of the bond between the suction cup and the mounting surface and is typically designed to provide compression towards the center 160 of the suction cup 110, which is hard to do manually.

In FIG. 1A the arm 120 is shown fully rotated towards the suction cup 120 and has contacted with the top 116 of the suction cup hardware 112 and an impact force 170, causing resealing, has been applied in a direction that is substantially parallel to the center 160 of the suction cup 120 and therefore substantially perpendicular to the interface between the suction cup and the surface on which it is mounted. [Note: as long as there is a component of the impact force 170 that is perpendicular than resealing will occur.]

The arm is represented as being substantially "U" shaped but could be in any configuration that is suitable for the item being supported by it. Additionally, the arm could be longer or shorter as necessary. The important point being that the arm is able to pivot, ideally due to gravity, and cause an impact force 170, causing resealing.

The pivot point 130 is represented as a pin running the arm 120 and attached at to the pivot hardware 114. Alternate embodiments such as a hinged mechanism and a ball and socket are also anticipated. The important aspect being the ability of the arm 120 to move pivotably toward the suction cup 110 and apply an impact force 160 that is substantially perpendicular to the interface between the suction cup 100 and the surface on which it is mounted.

Figure 1B:
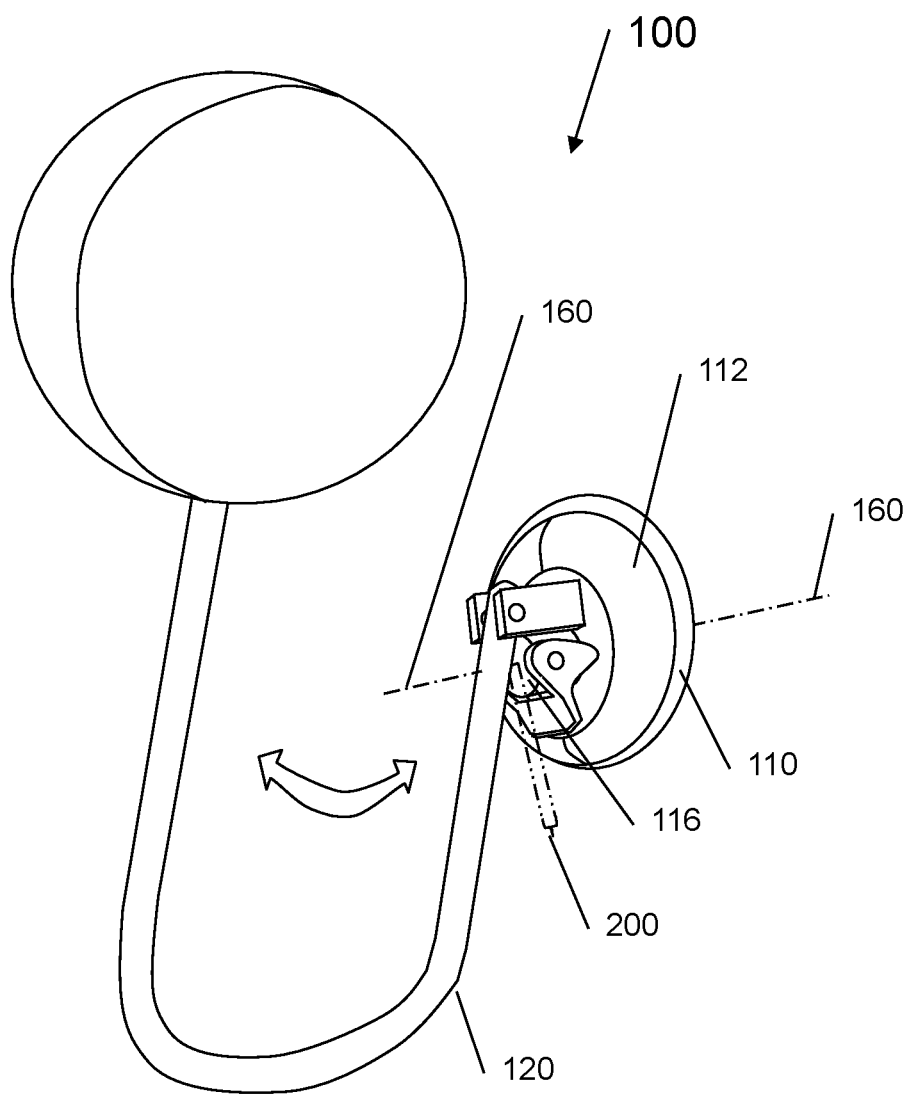
FIG. 1B show, in simplified form, the suction cup holding system with the arm pivoted away from the suction cup.

In contrast to FIG. 1A, FIG. 1B show, in simplified form, the suction cup holding system 100 with the arm 120 pivoted away from the suction cup 120. In this particular case, there is a gap 200 that is created between the arm 120 and the top 116 of the suction cup hardware 112. The gap is illustrated as being at the center 160 of the suction cup 110 but the location is not critical simply that the pivoting action causes a gap 200 to form.

Having described an exemplary suction cup holding system 100, its use and several representative alternative embodiments will now be described.

Figure 2:
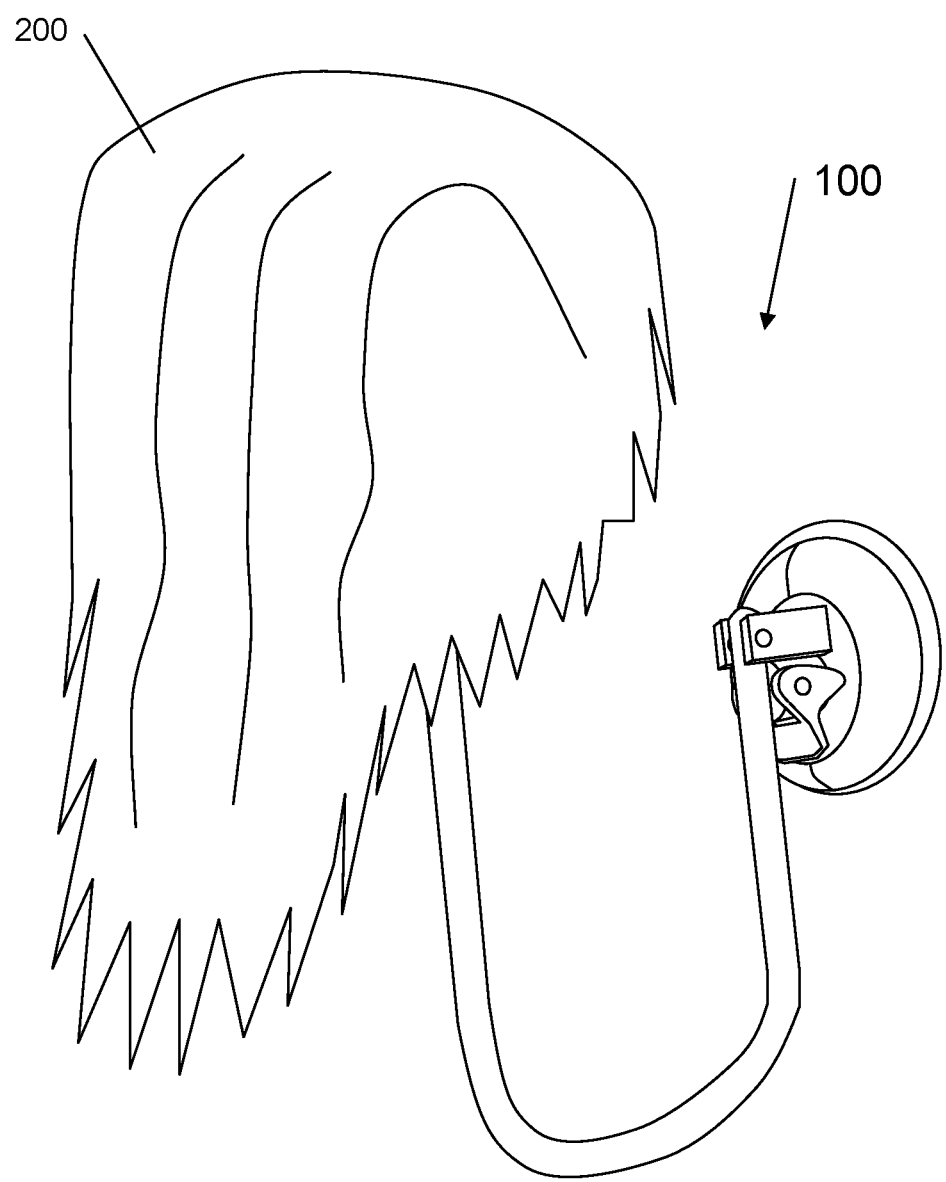
FIG. 2 show, in simplified form, the suction cup holding system holding a wig.

FIG. 2 show, in simplified form, the suction cup holding system 100 holding a wig 200. In FIG. 1A the attachment mechanism 150 was represented as substantially spherical in shape. For supporting a wig, or other item to be worn on the head (such as a hat or mask), a full (or half) spherical or oblong shape approximating the top of someone's head is desirable. The attachment mechanism can either be permanently attached to the arm, removably attached to the arm, or collapsibly attached such as an inflatable attachment mechanism or one that opens and closes like an umbrella.

Figure 3:
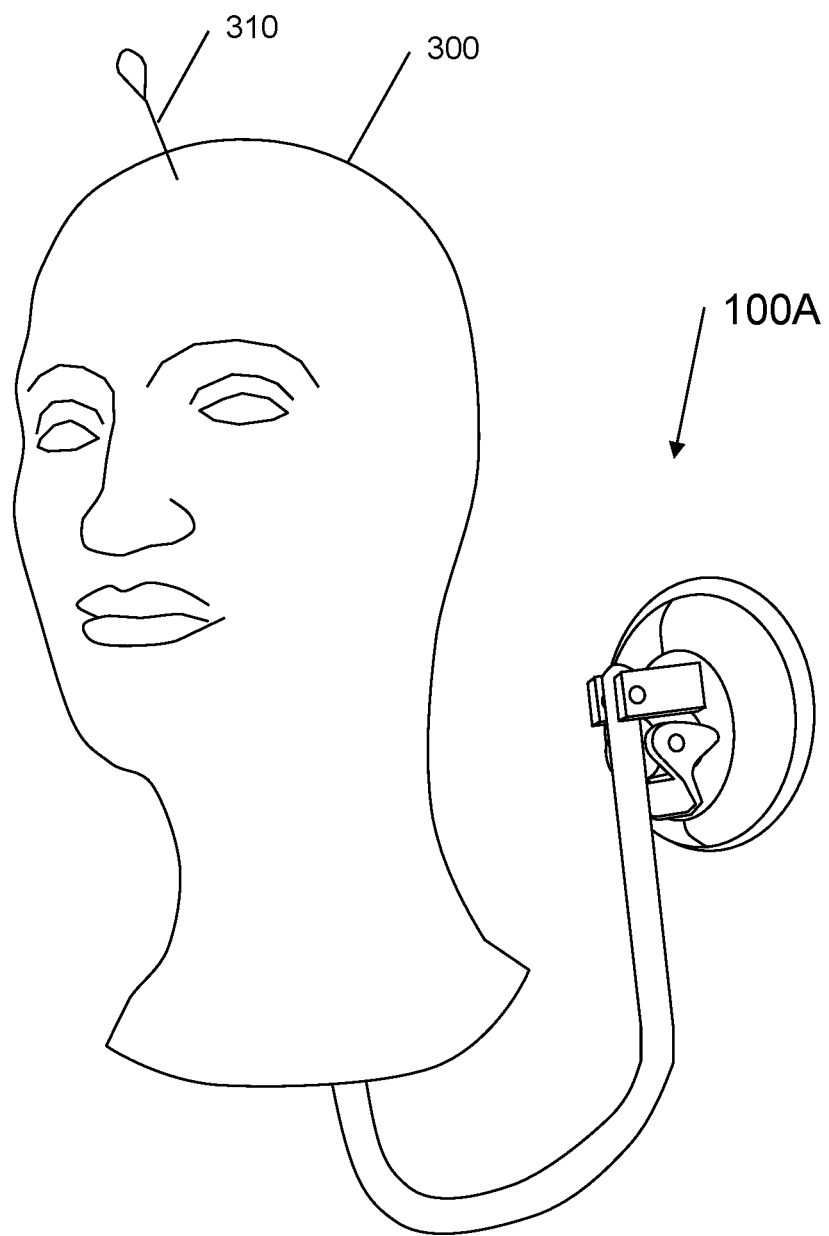
FIG. 3 show, in simplified form, a suction cup holding system with a "head" shaped attachment mechanism.

The geometry of the attachment mechanism can be any suitable geometry and need not be limited to simple shapes. For example, FIG. 3 show, in simplified form, a suction cup holding system 100A with a "head" shaped attachment mechanism 300, such as a standard Styrofoam™ manikin head. A standard Styrofoam™ manikin head is advantageous because auxiliary attachment mechanism 310 (a pin) can be inserted through a wig and into the head 300 to help maintain the wig, or other item to be worn on the head.

The attachment mechanism should be configured, in combination with any auxiliary attachment mechanisms required, to hold the item of interest. The attachment mechanism could be a simple "T" shape to hold a towel or a clip mechanism to hold a bag of potato chips (or other grocery item) to be displayed in a store. Other examples include suction cup systems used in the bath or shower, where the attachment mechanism may be for example a shelf to hold items such as shampoo or other toiletries that are picked up and then put back in place or a bar mechanism that people use for support as they get in and out of the bath or shower, where pulling against the bar causes the arm to pivot towards the suction cup. Pulling against an attachment mechanism and placing items onto an attachment mechanism are just a few of the many actions that can cause an arm to rotate towards a suction cup and cause an impact force to be applied to the suction cup that causes resealing. Other activities such as touch screen activation where the load applied to the device (e.g. GPS in a car or a tablet like device supported by a suction cup mounting system and attached to a refrigerator) is applied by an individual pushing on a screen, which in turn can cause an arm to rotate towards a suction cup and cause an impact force to be applied to the suction cup that causes resealing.

Having described several alternative embodiments, we will return to discuss the initial exemplary suction cup holding system 100 of FIG. 1A-B and FIG. 2 in greater detail in order to further describe the method of use.

Figure 4A:
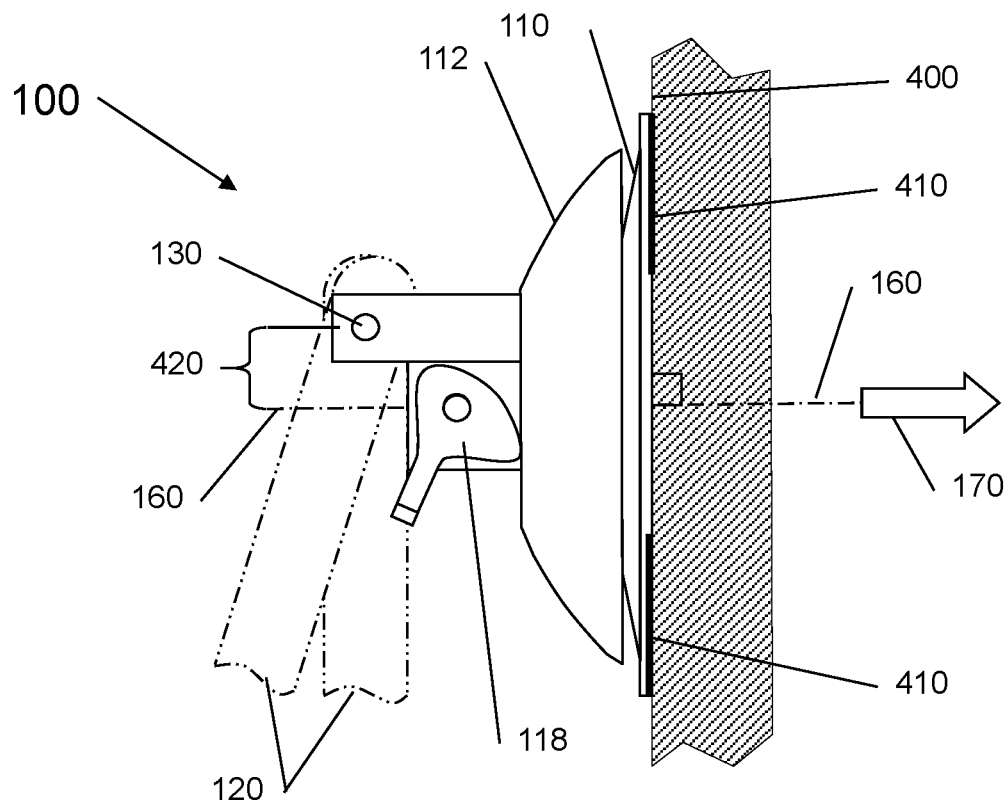
FIG. 4A show, in simplified form, a side view of a portion of the suction cup holding system in an unlocked position.
Figure 4B:
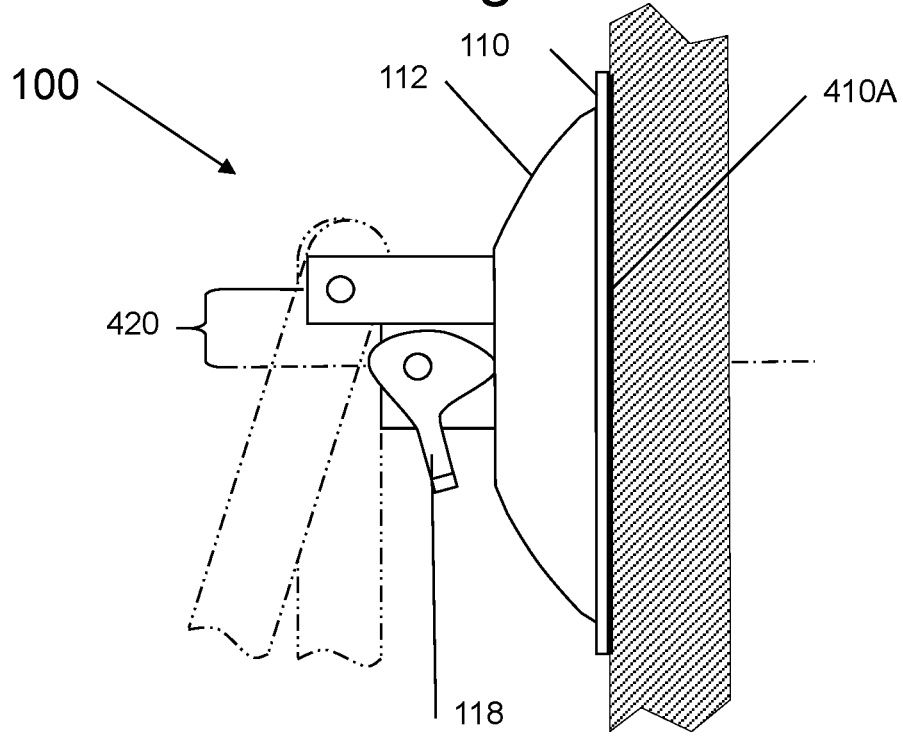
FIG. 4B show, in simplified form, a side view of a portion of the suction cup holding system in a locked position.

FIG. 4A show, in simplified form, a side view of a portion of the suction cup holding system 100 in an unlocked position and FIG. 4B show, in simplified form, a side view of a portion of the suction cup holding system 100 in a locked position.

In FIG. 4A the suction cup 110 is mounted to a surface 400 and the interface 410 between the suction cup 110 and the surface 400, for illustration purposes, has been indicated by a slightly thicker line. In FIG. 4A the interface 410 and is only shown at the two ends rather than running the whole length as represented by interface 410A of FIG. 4B. The optional locking mechanism 118 is in the unlocked position in FIG. 4A and in the locked position in FIG. 4B.

During locking, the locking mechanism 118 causes the suction cup hardware 112 to force the suction cup 110 to be compressed against the surface 400 and increases the amount the size of the interface 410A.

In general, with respect to suction cups, the larger the interface the more holding power and the heavier the load that can be supported. Over time, if nothing else is done, the interface will begin to get smaller and smaller, typically due to air leaks, and eventually the suction cup will fail to adhere to the surface an longer, causing potentially catastrophic circumstance.

However, that is not the case with the suction cup holding systems being disclosed, which causes the suction cup to have a resealing action when an item is placed onto it and will be further described with respect to FIG. 4A-B.

The method of use involves mounting a suction cup 110 on a surface 400, wherein the suction cup has an interface 410, 410A and a center 160 running through the suction cup 100 that is perpendicular to the interface 410, 410A when it is attached to the surface 400 and the center is such that the pivot point 130 of the of a pivotably attached arm 120 (shown in phantom lines) is configured to be away by at least a predetermined distance 420 from the center 160 of the suction cup 110 and the pivot point 130 is configured such that, when the arm 120 pivots in the direction of the suction cup 110, the arm 120 is capable of applying an impact force 170 substantially parallel to the center 160 of the suction cup 110 (and therefore substantially perpendicular to the interface) in order to cause resealing of the suction cup 110. The impact load 170 performs essentially the same function as the locking mechanism 118 in that it forces the suction cup 110 to be compressed against the surface 400 and increases the amount the size of the interface;

The method further involves suspending an item (not shown) from the arm 120, removing the item from the arm 120 and then re-suspending the item from the arm 120 and, in so doing the latter causing the arm 120 to apply an impact force 170 to cause resealing of the suction cup 110.

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of combining aspects of different variants described herein to form new variants, through the use of particular hardware or software, or through specific types of applications in which the invention can be used. That alternate embodiments may not have been presented for a specific portion of the description, or that further undescribed alternate or variant embodiments may be available for a portion of the invention, is not to be considered a disclaimer of those alternate or variant embodiments to the extent they also incorporate the minimum essential aspects of the invention, as claimed in the appended claims, or an equivalent thereof.

What is claimed:

1. A method of applying a resealing force to a suction cup comprising:
    mounting a suction cup, using a latching mechanism, onto a surface and thereby forming an interface between the suction cup and the surface, wherein the suction cup has a center running through the suction cup that is perpendicular to the interface and the center is such that a pivot point of a non-locking arm, pivotably attached to the suction cup, is away from the center of the suction cup and the pivot point is configured such that, when the arm pivots, independent of the latching mechanism, in the direction of the suction cup, the arm is capable of applying an impact force substantially parallel to the center of the suction cup in order to cause resealing of the suction cup;
    suspending an item from the arm;
    removing the item from the arm;
    re-suspending the item from the arm and, in so doing, pivoting the arm in the direction of the suction cup and applying the impact force to cause resealing of the suction cup.

2. The method of claim 1 wherein the item being suspended from the arm is an item worn on your head wig.

3. The method of claim 2 wherein the item being suspended from the arm is a wig.

4. The method of claim 1 wherein attached to the arm, distal from the pivot point, is a mounting attachment configured to facilitate suspending items from the arm.

5. The method of claim 4 wherein the mounting attachment is removable.

6. The method of claim 4 wherein the mounting attachment is collapsible.

7. The method of claim 4 wherein the mounting attachment is substantially shaped like a human head.

8. The method of claim 4 wherein the mounting attachment is substantially shaped like the top of a human head.

* * * * *